(12) United States Patent
Kiefer

(10) Patent No.: US 6,464,421 B1
(45) Date of Patent: Oct. 15, 2002

(54) JACK EXTENSION TUBE FOR A POWER SEAT ADJUSTER MECHANISM FOR A VEHICLE

(75) Inventor: James Kiefer, Grand Rapids, MI (US)

(73) Assignee: RAN Enterprises, Inc., Grand Rapids, MI (US)

( * ) Notice: Subject to any disclaimer, the term of this patent is extended or adjusted under 35 U.S.C. 154(b) by 177 days.

(21) Appl. No.: 09/661,939

(22) Filed: Sep. 14, 2000

Related U.S. Application Data

(63) Continuation-in-part of application No. 09/281,686, filed on Mar. 30, 1999, now Pat. No. 6,293,723.
(60) Provisional application No. 60/080,426, filed on Apr. 2, 1998.

(51) Int. Cl.$^7$ ............................................... F16H 29/20
(52) U.S. Cl. ..................... 403/21; 74/87.36; 403/299
(58) Field of Search ................... 403/21, 299; 411/301, 411/302, 901; 74/89.36

(56) References Cited

U.S. PATENT DOCUMENTS

| | | |
|---|---|---|
| 2,966,069 A | 12/1960 | Wise |
| 2,979,965 A | 4/1961 | Diebold |
| 3,049,935 A | 8/1962 | Simmons et al. |
| 3,164,029 A | 1/1965 | Martens |
| 3,178,957 A | 4/1965 | Martens |
| 3,200,664 A | 8/1965 | Mauric |
| 3,206,994 A | 9/1965 | Angsten |
| 3,277,736 A | 10/1966 | Goodman |

(List continued on next page.)

Primary Examiner—Lynne H. Browne
Assistant Examiner—John R. Cottingham
(74) Attorney, Agent, or Firm—McGarry Bair LLP

(57) ABSTRACT

A jack extension tube preferably for vehicles is provided which comprises a tube having a first section with an open end and a second section spaced from the first section, the elongated tube made from a first material. A nut made from a second material less rigid than the first material is fixedly mounted in the first section, the nut having first and second opposed faces and a threaded bore therethrough. The threaded bore preferably terminates in the first and second faces of the nut. Extruded holes are provided in the second section adapted to receive a fastener, a jack screw is received in the first section open end and is threadably received in the threaded bore of the nut. The jack screw has at least one of an exposed end with a gear, an opposite end defining a stop which retains the nut on the jack screw when the nut is threaded to the opposite end of the jack screw, and a gear housing mounted adjacent to the screw. The jack screw is thereby threadingly mounted for movement between a fully extended and a fully retracted position with respect to the nut. The nut preferably has an extension extending outwardly from each of the first and second faces thereof, the extensions made from a third material less rigid than the first material. The extension on each face of the nut is configured so as to contact the at least one of the gear, the stop, and the gear housing to thereby prevent the screw both from damaging the nut by drawing the at least one of the gear, the stop, and the gear housing into the nut as well as drawing the at least one of the gear, the stop, and the gear housing into the elongated tube as the jack screw approaches the fully extended or fully retracted positions with respect to the nut.

20 Claims, 4 Drawing Sheets

U.S. PATENT DOCUMENTS

| | | |
|---|---|---|
| 3,490,062 A | 1/1970 | Wagner et al. |
| 3,590,464 A | 7/1971 | Wildi et al. |
| 3,732,744 A | 5/1973 | Rowland |
| 3,837,755 A | 9/1974 | Benoit et al. |
| 4,127,343 A | 11/1978 | Potter |
| 4,137,784 A | 2/1979 | Griffin |
| 4,266,437 A | 5/1981 | Obergfell |
| 4,552,403 A | 11/1985 | Yindra |
| 4,623,051 A | 11/1986 | Lochmoeller |
| 4,679,451 A | 7/1987 | Nakamura |
| 4,696,512 A | 9/1987 | Burnett et al. |
| 4,817,977 A | 4/1989 | Bookbinder |
| 4,858,481 A | 8/1989 | Abraham |
| 5,136,889 A | 8/1992 | Hill et al. |
| 5,172,601 A | 12/1992 | Siegrist et al. |
| 5,174,167 A | 12/1992 | Hill et al. |
| 5,312,198 A | 5/1994 | Kiefer |
| 5,346,045 A | 9/1994 | Bennett et al. |
| 5,528,951 A | 6/1996 | Takahashi et al. |
| 5,536,100 A | 7/1996 | Kiefer |
| 5,542,744 A | 8/1996 | Bathrick |
| 5,606,790 A | 3/1997 | Laue |
| 5,797,293 A | 8/1998 | Chaban |
| 5,797,574 A | 8/1998 | Brooks et al. |
| 5,911,789 A | 6/1999 | Keipert et al. |
| 6,003,394 A * | 12/1999 | Heckel, Jr. .............. 74/89.36 X |
| 6,293,723 B1 * | 9/2001 | Kiefer ........................ 403/21 |
| 6,327,924 B2 * | 12/2001 | Nagai et al. |

* cited by examiner

JACK EXTENSION TUBE FOR A POWER SEAT ADJUSTER MECHANISM FOR A VEHICLE

Cross-Reference to Related Applications

This application is a continuation-in-part application of U.S. patent application Ser. No. 09/281,686, filed Mar. 30, 1999 now U.S. Pat. No 6,293,723, which, in turn, claims the benefit of U.S. Provisional Application Serial No. 60/080,426, filed Apr. 2, 1998.

BACKGROUND OF THE INVENTION

1. Field of the Invention

This invention relates to a jack extension tube for use on power seat adjuster mechanisms for vehicles and, in particular, to a jack extension tube having low-noise operational characteristics and a low-torque internal stop-release.

2. Description of Related Art

Jack extension tubes are used in power seat adjuster mechanisms for vehicles to operably connect a vehicle seat track or seat back to a powering mechanism to move the seat or any component thereof in a desired direction via a link member. By varying the length of the tube, jack extension tubes allow a particular seat adjuster mechanism to be used with seats on different vehicle models. Further, the tubular construction allows cost savings and weight savings over a solid machined rod. Two known prior art jack extension tubes are shown in greater detail in commonly-assigned U.S. Pat. Nos. 5,312,198 and 5,536,100 issued May 17, 1994 and Jul. 16, 1996, respectively. Typically, the link member is mounted to the extension tube by a fastener such as a shoulder bolt with an attached nut, a pin, a rivet and the like.

However, because these extension tubes are often manufactured solely from steel or other metal components, some prior jack extension tubes have been known to make excessive amounts of noise during operation—more than is aesthetically pleasing while adjusting the seat in the passenger compartment of the vehicle. Further, prior extension tubes are often subject to "chucking"—looseness between components of the jack extension tube and adjustment screw which contributes to unacceptable noise and seat vibration. Further, damage can occur between components of the extension tubes as the tube approaches an innermost or outermost position, especially in circumstances where various components are made from different materials having disparate hardness and strength.

SUMMARY OF THE INVENTION

The invention generally relates to a jack extension tube for vehicles comprising an elongated tube having a first section with an open end and a second section spaced from the first section. A threaded nut is mounted in the first section and a mounting flange is provided in the second section which is adapted to receive a fastener. A jack screw is received in the first section open end and is threadably received in the threaded nut. The jack screw can include an exposed end defining a gear and an opposite end configured so that the jack screw is retained in the threaded nut and cannot be fully unscrewed from the threaded nut.

In a specific embodiment, the invention comprises a jack extension tube preferably for vehicles is provided which comprises an elongated tube having a first section with an open end and a second section spaced from the first section, the tube made from a first material. A nut made from a second material less rigid than the first material is fixedly mounted in the first section, the nut having first and second opposed faces and a threaded bore therethrough. The threaded bore preferably terminates in the first and second faces of the nut.

Holes are provided in the second section adapted to receive a fastener, a jack screw is received in the first section open end and is threadably received in the threaded bore of the nut. The jack screw has at least one of an exposed end with a gear, an opposite end defining a stop which retains the nut on the jack screw when the nut is threaded to the opposite end of the jack screw, and a gear housing mounted adjacent to the screw.

The jack screw is thereby threadingly mounted for movement between a fully extended and a fully retracted position with respect to the nut. The nut preferably has an extension extending outwardly from each of the first and second faces thereof, the extensions made from a third material less rigid than the first material. The extension on each face of the nut is configured so as to contact the gear hub, the stop, and the gear housing to thereby prevent the screw both from damaging the nut, the stop, and the gear housing into the nut as well as drawing the at least one of the gear, the stop, and the gear housing into the elongated tube as the jack screw approaches the fully extended or fully retracted positions with respect to the nut.

In more specific embodiments of the invention, the third material can be the same as the second material whereby the nut and the extensions are made as a unit from the same material. The stop can be made from the same material as the nut. The at least one of the gear and the gear housing has a portion contacting the nut in the fully retracted position made from the same material as the nut. The housing can comprise at least one punched-in area adjacent either opposed face of the nut to encapsulate retain the nut within the housing and thereby prevent axial movement of the threaded nut within the elongated tube. The second material can comprise rigid synthetic resin material. The first material can comprise one of aluminum, steel and a steel alloy. The second material can be reinforced with fibers. The second material can be a reinforced nylon material. Threads on the threaded bore of the nut can be involute threads.

The fixed mounting of the nut to the tube comprises deformed areas of the elongated tube encapsulating at least a portion of each of the opposed faces of the nut to prevent substantial axial movement of the nut with respect to the elongated tube. At least one of the extensions of the nut extends beyond the deformed areas of the housing whereby the at least one of the extensions form a bearing surface for receiving the at least one of the at least one of the gear, the stop, and the gear housing when the screw approaches the fully extended or fully retracted positions with respect to the nut.

BRIEF DESCRIPTION OF THE DRAWINGS

The invention will now be described with reference to the drawings in which.

DETAILED DESCRIPTION OF THE PREFERRED EMBODIMENTS

Figure 1:
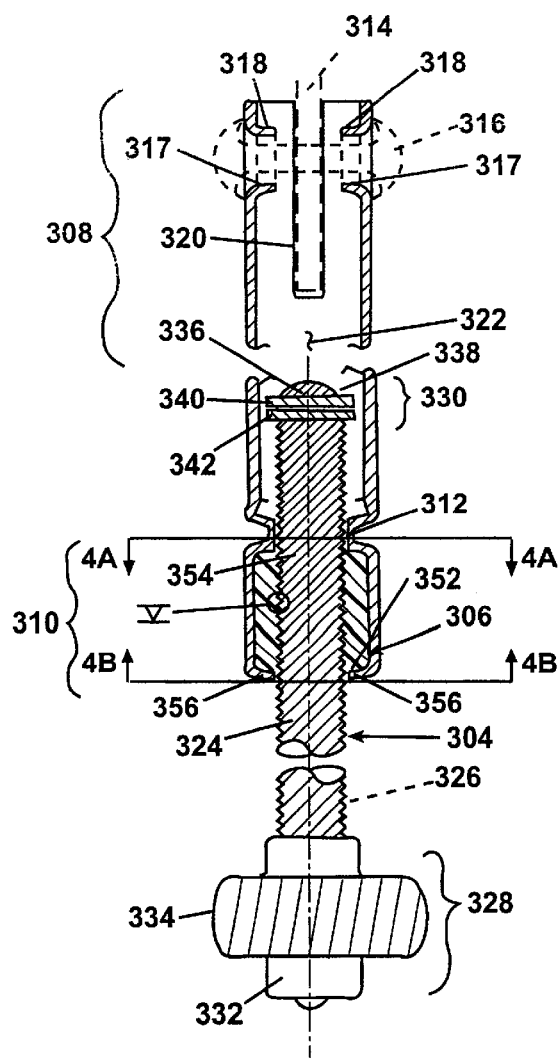
FIG. 1 is a longitudinal cross-sectional view of an extension tube assembly for a seat adjuster mechanism according to the invention comprising a housing which securely mounts a muffling nut which, in turn, threadably receives a jack screw.

Referring to the drawings and to FIGS. 1–4 in particular, an improved jack extension tube 300 is shown comprising a housing 302, a screw 304 and a muffler such as a muffling nut 306.

The housing 302 is preferably made from an aluminum- or steel-based material and comprises a tubular member, preferably having a rectangular cross section, with a first end 308 and a second end 310. At least one inwardly-extending flange 312 is defined intermediate the first and second ends 308 and 310 and preferably more closely adjacent to the second end 310.

The first end 308 of the housing 302 is preferably arranged to pivotally receive a link member 314 shown in phantom lines in FIG. 1. To this end, the housing 302 has a pair of opposed reinforced openings 317 formed by a pair of inwardly-directed extruded holes 318 which are described more fully in the commonly-assigned U.S. Pat. No. 5,312, 198 and is incorporated herein by reference. The openings 317 are adapted to receive a fastener such as a rivet 316 therein. An elongated slot 320 is also formed in the second end 308 of the housing 302 and extends longitudinally toward the first end 310 of the housing 302. The elongated slot 320 defines a receiving area for the link 314. The link member 314 is pivotally mounted to the first end 308 of the housing 302 by the rivet 316 or any other known fastener such as a shoulder bolt, a pin and the like.

The link member 314 includes an opposite end (not shown) which is interconnected within a conventional seat adjuster mechanism which is well known in the seat adjuster art. The seat adjuster mechanism can be any mechanism used to move, orient, or translate a vehicle seat with respect to the passenger compartment of a vehicle, such as adjusters which extend or retract a seat longitudinally or vertically within the vehicle interior, a recliner mechanism for altering the angular configuration of the vehicle seat, and other similar mechanisms.

The components of the extension tube assembly, such as the housing 302, screw 304, and muffling nut 306, are held together more securely than prior art jack extension tubes, making failure of the extension tube assembly 300 less likely.

The housing 302 defines an internal longitudinal chamber 322 along the length thereof. The housing 302 is preferably formed from a rigid metal, such as steel, aluminum, or an alloy thereof, although it is contemplated that the housing 302 can also be formed from a synthetic resin material which has sufficient strength and rigidity to maintain the stresses encountered by the housing 302.

Figure 5:
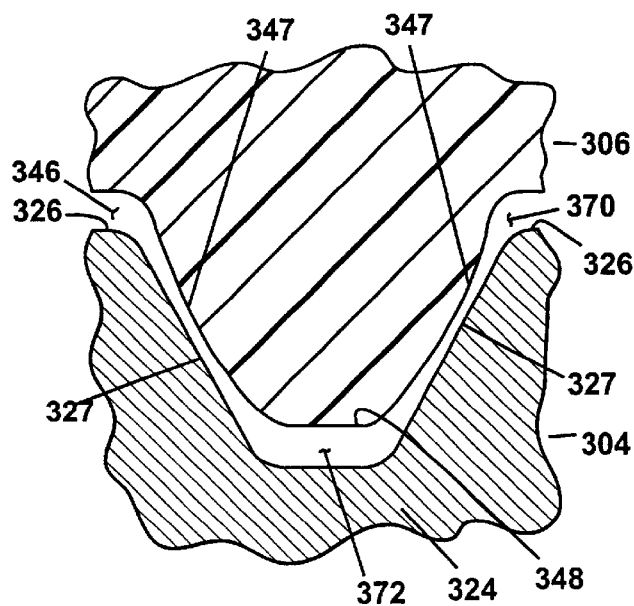
FIG. 5 is an enlarged cross-sectional view of the area marked V in FIG. 1 showing the interengagement of threads on the screw and the nut of the jack extension tube of FIG. 1.

As shown in FIG. 1 and in greater detail in FIG. 5, the screw 304 preferably comprises an elongated shaft 324 having a spirally-wound thread 326 thereon which extends between a first end 328 and a second end 330 of the screw 304. The screw 304 is preferably constructed from a rigid metal, such as steel or aluminum, and the pitch of the threads 326 is preselected to provide a predetermined conversion of rotary-to-linear motion of the screw 304 with respect to the housing 302. As shown in FIG. 5, the threads 326 of the screw 304 are preferably a standard helical thread with angularly-configured threads 327 thereon.

The first end 328 of the screw 304 is provided with a flange 332 non-rotatably mounted to the first end 328 of the screw 304 in a conventional manner. The flange 332 preferably includes any known engagement portion, such as a gear 334, adapted to be rotatably driven by a conventional seat adjuster motor (not shown). It will be understood that the member 334 can comprise other known mechanical engagement elements, such as a pulley, a transmission or a gearbox, or any other suitable component which can be interconnected to the seat adjuster motor.

Figure 3:
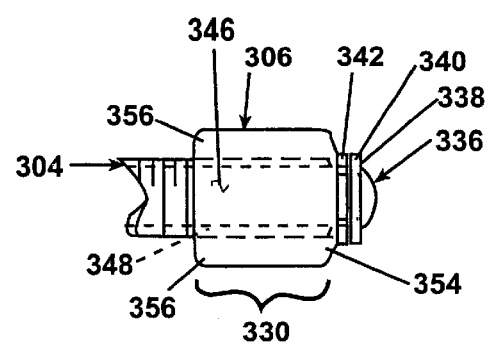
FIG. 3 is an elevational view of the muffling nut of FIGS. 1–2 with the screw extending therethrough.

As shown in FIG. 1 and in greater detail in FIG. 3, the second end 330 of the screw 304 preferably comprises a head 336 which defines a shoulder 338 thereon. First and second rings 340 and 342 are rotatably received on the shaft 324 of the screw 304 so that the first ring 340 abuts the shoulder 338 of the head 336, and the second ring 342 is located axially inwardly of the first ring 340. The rings 340 and 342 are integral to an inventive feature of the extension tube assembly 300 whereby the screw 304 requires very little stop-release torque when abutted against the muffling nut 306. In the example extension tube assembly 300 shown herein, the first and second rings 340 and 342 preferably comprise a synthetic resin bushing and a metal washer, respectively.

Figure 2:
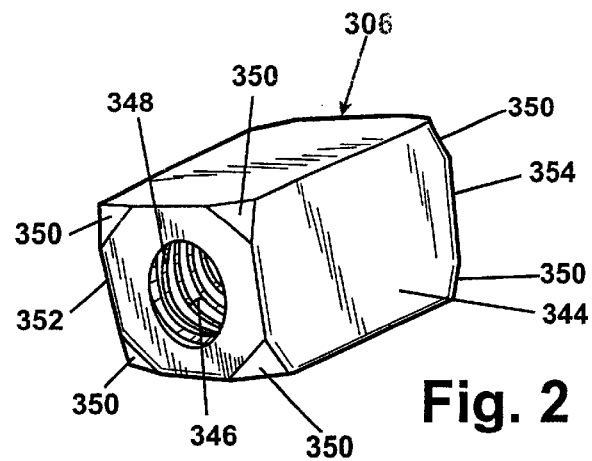
FIG. 2 is a perspective view of the muffling nut shown in the extension tube assembly of FIG. 1.

As best shown in FIG. 1 and in greater detail in FIG. 2, the muffling nut 306 comprises an elongated body 344 preferably shaped to coincide with a portion of the interior chamber 322 of the housing 302 located between the flanges 312 and the second end 310 thereof. In this illustrated embodiment, the muffling nut is square in cross section. The muffling nut 306 also includes a longitudinal threaded bore 346 with internal threads 348 that correspond in pitch to the threads 326 on the screw 324 so that the bore 346 is adapted to receive the screw 304. As needed, the body 344 of the muffling nut 306 can be formed with chamfered portions 350 on front and rear faces 352 and 354 thereof to aid in the retention of the muffling nut 306 within the housing 302.

The muffling nut 306 is preferably made from a polymer composite resin, filled nylon such as Celstran No. N66G40.02.4, and is preferably injection molded to the desired shape. The material comprising the muffling nut 306 is preferably any type of high-strength material which has a tensile strength of at least $8 \times 10^3$ psi. Further, it is preferable that the material have a tensile modulus of greater than $0.40 \times 10^6$ psi. It has been found that a nylon which has been reinforced with at least 30% glass fibers produces preferable results in preventing the screw 304 from being separated from the nut 306 during use. For example, the above-identified Celstran material has 40% glass fibers in a nylon base, a tensile strength of approximately $33.7 \times 10^3$ psi and a tensile modulus of approximately $1.7 \times 10^6$ psi. Further, it has also been found that a lower-cost glass-filled acetal polymer of approximately a 33% ratio can also produce desirable results. An example of this material is available under the trade name Zytel 70G33 HSIL. Each of the above materials can be provided with a lubricant for additional beneficial results in the interaction with the screw 304.

The muffling nut 306 is preferably molded to the desired shape including the threads 348 on the internal bore 346 thereof. Although the threads 348 can be a conventional helical thread aligned with the thread 327 of the threads 326 of the screw 304, it has been found that an "involute" screw thread such as that shown at 348 in FIG. 5 provides beneficial results. A characteristic of the involute screw thread is an arcuate surface 347 which preferably has a large radius of curvature compared to the overall height and pitch of the threads 348 of the nut 306. The configuration of the involute screw threads 348 is shown in detail in FIG. 5. A gap 370 is preferably defined adjacent to a distal edge of each thread 326 of the screw 304 between a proximal edge of each screw thread 348 of the nut 306. Further, a gap 372 is defined adjacent a distal edge of each thread 348 of the nut 306 and a proximal edge adjacent each thread 326 of the screw 304. Further, the involute screw threads on the nut 306 shown by the arcuate surface 347 on each thread 348 provide a reduced contact surface of the threads 348 on the nut 306 with the threads 326 on the screw 304. The gaps 360 and 362 cooperate with the involute screw threads 348 on the nut 306 to provide a reduced contact surface of the nut 306 with the screw 304 at the points of interengagement between the threads of each component. This involute thread configuration proves advantageous in eliminating "chucking" between the screw 304 and the nut 306. This reduction in chucking reduces the looseness between the screw 304 and nut 306 which thereby reduces noise and seat vibration during operation of a power seat adjusting assembly in which the jack extension tube according this invention is incorporated.

To create a subassembly of the screw 304 and muffling nut 306, the threads 326 on the screw 304 are mounted within the threaded bore 346 of the muffling nut 306 so that the threads 348 of the bore 346 engage the threads 326 of the shaft 324. The rings 340 and 342 are located between the shoulder 338 of the head 336 of the screw 304 and the rear face 354 of the muffling nut 306.

Figure 4A:
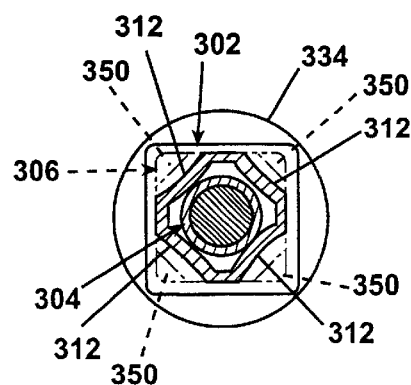
FIG. 4A is a cross-sectional view of the extension tube assembly taken along lines 4A—4A of FIG. 1, showing flanges of the housing extending inwardly adjacent to one end of the muffling nut for securely mounting the nut within the housing.

As shown in FIGS. 1 and 4A, the subassembly can then be mounted to the housing 302 by inserting the muffling nut 306 within the open second end 310 of the housing 302 so that the rear face 354 of the muffling nut 306 abuts the flanges 312. The muffling nut 306 thereby occupies the portion of the internal chamber 322 located between the flanges 312 and the second end 310 of the housing 302.

Figure 4B:
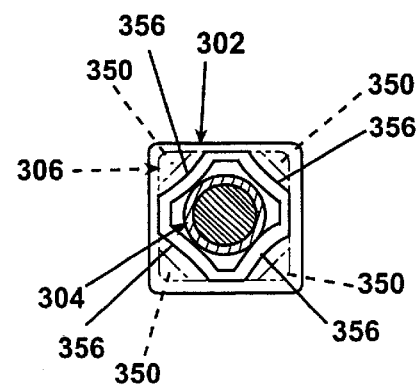
FIG. 4B is a cross-sectional view of the extension tube assembly taken along lines 4B—4B of FIG. 1 showing flanges of the housing extending inwardly adjacent to an end opposite the end shown in FIG. 4A for securely mounting the nut within the housing.

After insertion of the muffling nut 306 into the portion of the interior chamber 322 between the flanges 312 and the second end 310 of the housing 302, end portions 356 of the second end 310 of the housing 302 are formed or folded around the chamfered portions 350 on the front face 352 of the muffling nut 306 as shown in FIGS. 1 and in greater detail in FIG. 4B. Thus, the muffling nut 306 is securely mounted within the portion of the interior chamber 322 between the flanges 312 and the end portions 356 located at the second end 310 of the housing 302.

This retention of the muffling nut 306 within the housing 302 provides a more secure mounting of the muffling nut 306 within the housing 302. The screw 304 and muffling nut 306 subassembly are prevented from being inadvertently removed from the housing 302 when undue forces are applied to the extension tube assembly 300 such as during a vehicle collision.

It will be understood that the head 336, shoulder 338, and the rings 340 and 342 cooperate, either alone or in combination, to define a stop for the second end 330 of the screw 304 relative to the rear face 354 of the muffling nut 306. Specifically, when the second end 330 of the screw 304 approaches the rear face 354 of the muffling nut 306 (so that the tube 300 is in the fully extended position) the stop prevents the second end 330 of the screw 304 from traversing into the bore 346 of the muffling nut 306 and along the threads 348 thereof. The abutment of the stop against the rear face 354 of the muffling nut 306 thereby prevents the screw 304 from becoming separated from the threaded engagement with the muffling nut 306 due to overtravel of the screw 304 with respect to the muffling nut 306 which, in turn, prevents the extension tube assembly 300 from becoming inoperable if the separation occurs.

As described above, the link member 314 is pivotally mounted at the first end 308 of the housing 302 by a known fastener, such as a rivet 316 mounted through the link member 314 within the openings 317, so that the link member 314 can pivot relative to the slot 320. Further, the gear 334 located at the first end 328 of the screw 304 is operably interconnected with a conventional motor for the seat adjuster mechanism.

During operation of the seat adjuster mechanism, the motor is selectively actuated by a user to perform a particular adjusting operation for a vehicle seat. When the motor is actuated by the user, rotation is imparted to the gear 334 which, in turn, rotates the screw 304. Due to the engagement of the threads 326 of the screw 304 with the threads 348 of the muffling nut 306, the muffling nut 306 and the associated housing 302 move longitudinally along the screw 304.

It will be understood that the movement of the housing 302 along the screw 304 is limited at fully retracted and fully extended positions and can be preselected by sizing the housing 302 and screw 304 accordingly and mounting the screw 304 to the housing 302 to produce a desired length of travel for the tube 300.

In the fully extended position, the second ring 342 on the second end of the screw 304 contacts the rearward face 354 of the muffling nut 306. The first ring 340 is retained between the second ring 342 and the shoulder 338 of the head 336 located at the second end 330 of the screw 304. This fully retracted position is shown in greater detail in FIG. 3.

Preferably, the first and second rings 340 and 342 are formed from different materials. The first ring or bushing 340 is preferably formed from a self lubricating synthetic resin, such as polyethlyene, polypropylene, nylon, or a composite similar to the material of the muffling nut 306. The second ring or washer 342 is preferably formed from metal such as steel or aluminum or a material having properties similar to that of the screw 304. Thus, in the fully extended position, the second ring 342 is abutted between the first ring 340 and the muffling nut 306.

This interengagement of the differing materials of these components accomplishes some important functions. First, as the screw 304 approaches the fully extended position, the head 336 can be smoothly tightened against the muffling nut 306 with one or both of the first and second rings 340 and 342 slipping slightly. Second, as the seat adjuster motor is actuated in reverse to retract the head 336 of the screw 304 from abutment with the muffling nut 306, the rings 340 and 342 smoothly disengage from abutment with the rear face 354 of the muffling nut 306 with little torque required due to the self-lubricating nature of the second ring 342.

Thus, the screw 304 smoothly decreases speed and stops when the rings 340 and 342 abut the rear face 354 of the muffling nut 306 at the fully retraced position. Conversely, the head 336 of the screw 304 is easily moved out of abutment with the rear face 354 of the muffling nut 306 when the screw 304 is extended therefrom. Binding and/or damage to any of the components contained in the jack extension tube 300 are substantially reduced.

The muffling nut 306 also provides the important function of reducing noise during retraction and extension of the housing 302 with respect to the screw 304. The different materials of the screw 304 and the muffling nut 306 reduce noise generated as the threads 326 of the screw 304 move along the threads 348 of the muffling nut 306. Further, the involute thread configuration on one or both of the threads 326 and 348 of the screw 304 and nut 306, respectively, aids this reduction in noise and prevents chucking.

For example, the embodiment described herein has a metal screw 304 and a synthetic resin muffling nut 306. The friction, and therefore the noise, between the metal screw 304 and the synthetic resin muffling nut 306 is substantially less than the friction between a pair of metal components.

It will be understood that any known sound-deadening materials can be used for the muffling nut 306, can be impregnated therein, or can line the threads 348 of the muffling nut 306 to provide additional reduction of the noise emitted from the extension tube assembly 300 during operation thereof due to the rotation of the screw 304 with respect to the housing 302.

Figure 6:
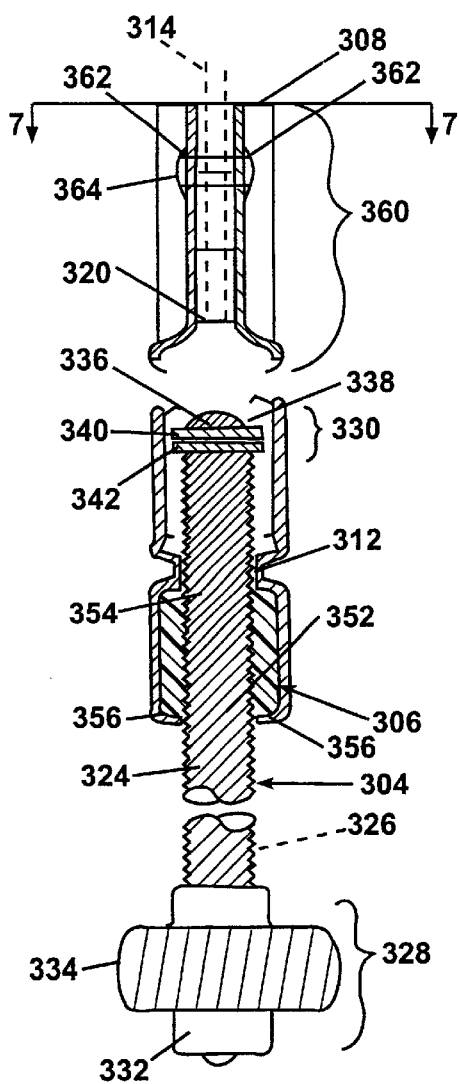
FIG. 6 is a front elevational view of an alternative embodiment of an extension tube assembly according to the invention and having a necked-down portion for mounting a link in the seat adjuster mechanism.
Figure 7:
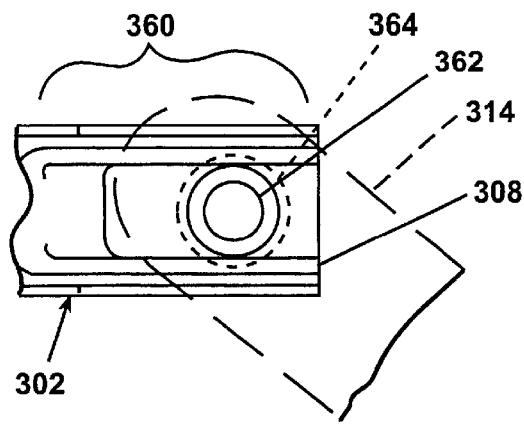
FIG. 7 is a side elevational view of the extension tube of FIG. 6 showing the mounting of a link member within openings in phantom outlines.

An alternative embodiment of the extension tube 300 is shown in FIGS. 6–7. It will be understood that like reference numbers identify elements common to the embodiment shown in FIGS. 6–7 and the previous embodiment shown in FIGS. 1–5.

The alternative embodiment of the extension tube includes a necked-down portion 360 located at the first end 308 of the housing 302. The necked-down portion 360 has a pair of inwardly-extending flanges 362 which are configured to receive a rivet 364 whereby a standard tool or press can be used to pivotally mount the link member 314 within the slot 320. The remainder of the structure and operation of the extension tube shown in FIGS. 6–7 operate the same as that shown in the previous embodiment of FIGS. 1–5.

Turning to FIGS. 8–13, another alternative embodiment of the jack extension tube 300 is shown whereby it will be understood that like reference numbers identify elements common to the previous embodiments shown in FIGS. 1–7. Thus, the basic elements and sub-elements of FIGS. 1–7 are not re-described with respect to FIGS. 8–13, but rather are indicated with like reference numerals.

Figure 8:
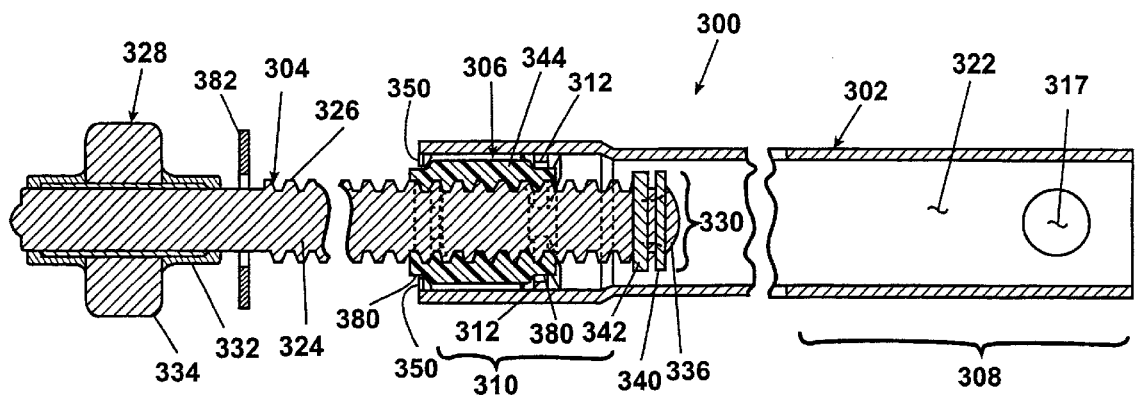
FIG. 8 is a front elevational view in section of another alternative embodiment of an extension tube assembly according to the invention wherein a nut having annular extensions extending from each end thereof is provided within a housing and a screw with a stop washer is mounted thereon and extends longitudinally through the housing.

Turning to FIG. 8 in particular, it can been seen that this embodiment of the jack extension tube assembly 300 is also comprised of a housing 302, a screw 304 and a muffling nut 306. It will be understood that the first end 308 of the housing 302 which is adapted to be mounted to a suitable member in a seat adjustment assembly (not shown) can be configured in any way necessary to accomplish the mounting to the seat assembly without departing from the scope of this invention. Potential ways of accomplishing this result can include the configurations previously described with respect to the embodiments shown in FIGS. 1–7.

Figure 9:
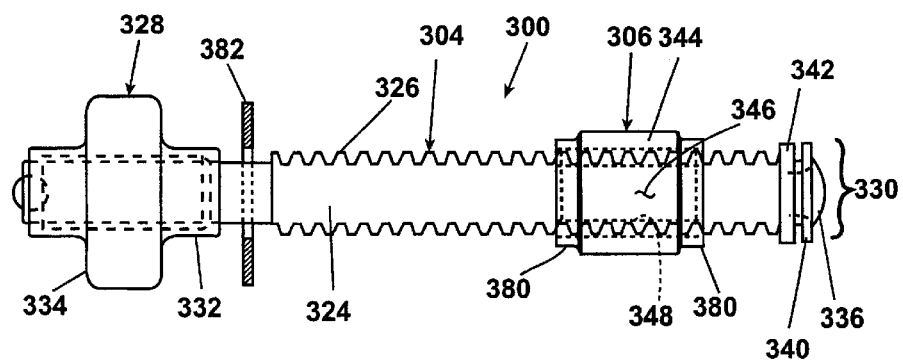
FIG. 9 is a front elevational view of the extension tube assembly of FIG. 8 with the housing removed for purposes of clarity to illustrate the mounting of the nut onto the screw with the stop washer mounted on one end of the screw and a gear housing at an opposite end thereof.
Figure 10:
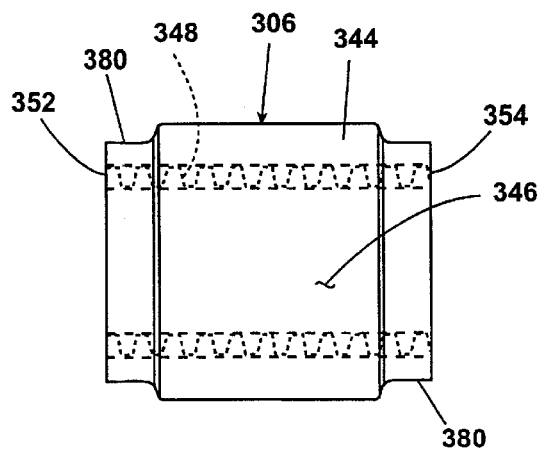
FIG. 10 is an enlarged front elevational view of the nut of FIGS. 8–9.

As described with respect to the previous embodiments as well and in greater detail in FIGS. 8–10, the nut 306 is encapsulated within the second end 310 of the housing 302 by several punched-in flanges 312 at the rear face 354 of the nut 306 and by punched-in areas 350 at the front face 352 thereof. The punched-in areas 312 and 350 form the encapsulation which serves to retain the nut 306 within the second end 310 of the housing 302.

The screw 304 is threaded within the encapsulated nut 306 and mounts a suitable transmission member, such as a gear or wheel 328 shown in FIGS. 8–9, which can be housed in a gear or transmission housing. This embodiment of the extension tube assembly 300 is adapted to also work with a second end 330 of the screw 304 wherein a fixed cap 336 with a shoulder 338 is provided thereon in addition to the two-ring configuration 340, 342 described with respect to the previous embodiments.

In the embodiment shown in FIGS. 8–13, the screw 304, typically made of a rigid metal such as steel, has the potential to cause the components mounted thereto (including the cap 336, gar wheel 328 and gear housing 382) to dig into the nut 306 when the screw 304 is in the fully extended and/or retracted position with respect to the nut 306 (and, thus, with respect to the housing 302) because these components mounted to the screw 304 can be simply much harder than the material making up the nut 306. Thus, these components can also be made of a material less strong and less rigid than the housing 302 and can be damaged as the screw reaches the fully extended and/or retracted positions since these components can be urged against the housing. This problem is alleviated in the present invention by providing the nut 306 with extensions 380 extending outwardly from each of the front and rear faces 352 and 354, respectively, of the nut 306. The extensions are preferably annular in configuration and co-axially aligned with the threaded bore 346 extending through the nut 306. As best shown in FIG. 10, the extensions 380 can also be provided with threads aligned in size, pitch and diameter with the threads 348 within the bore 346.

These extensions 380 thereby prevent the typically rigid material making up the components mounted to or adjacent the screw 304 from grinding into the more rigid material making up the housing 302 when the screw nears the fully extended and fully retracted positions with respect to the housing 302 and thus causing damage to the jack extension tube 300. For example, since the cap 336 and sleeve 332 of the screw 304, the gear housing 382, and the transmission member 328, respectively, can be made of a material similar in rigidity to the nut 306—and the housing 302 and the screw 304 are typically made from a much higher rigidity strength material, it is an important feature of the invention to protect the nut 306, cap 336, gear 328 and gear housing 382 from being ground by the screw 304 into the housing 302 as the screw 304 nears the fully extended and/or retracted positions with respect to the housing. Thus, the extensions 380, aligned with the cap 336 and the sleeve 332 of the transmission member 328, prevent the more rigid material of the housing 302 from contact with the components mounted to or adjacent the screw 304, and thus damaging these components when the screw 304 attempts to pass beyond the fully extended and fully retracted positions with respect to the nut 306 and thereby the housing 302.

Figure 11:
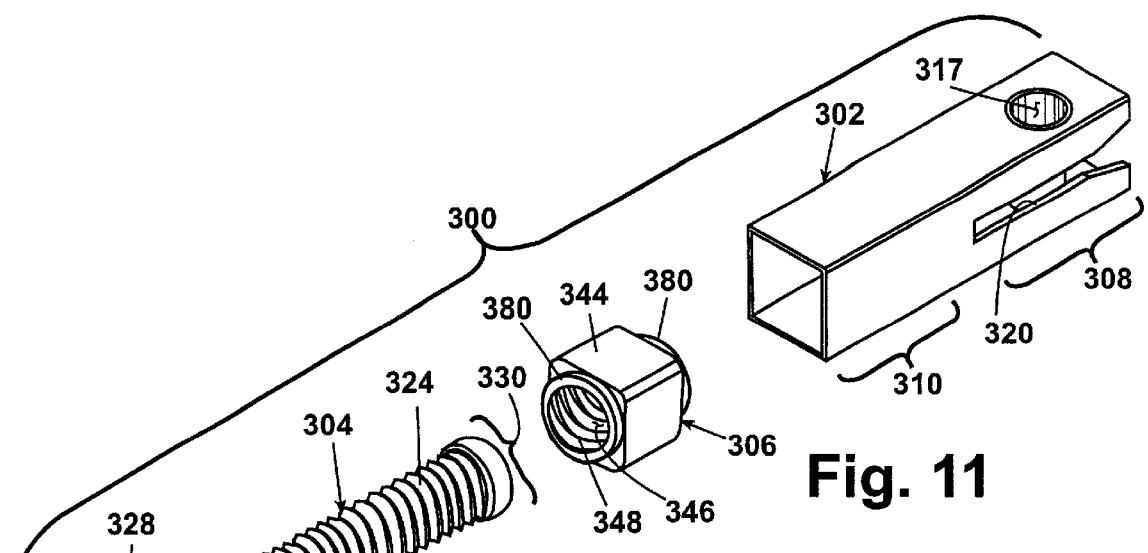
FIG. 11 is an exploded, perspective view of the extension tube assembly of FIG. 8 showing the screw with the stop washer and gear housing, nut, and housing in a longitudinally-aligned orientation.
Figure 12:
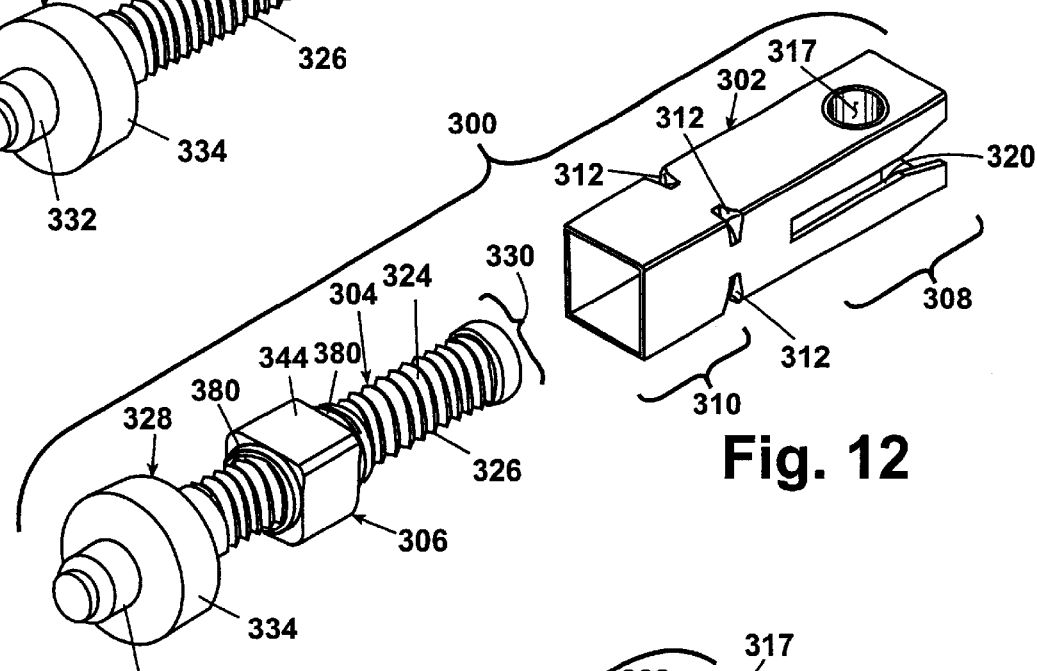
FIG. 12 is an exploded perspective view of the extension tube assembly of FIG. 11 showing the nut threadingly mounted onto the screw.
Figure 13:
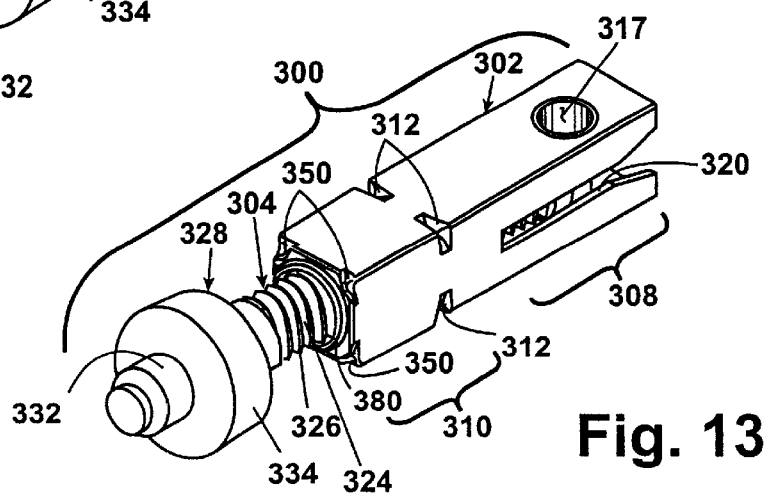
FIG. 13 is a perspective view of the assembled extension tube assembly of FIG. 12 wherein the nut with the screw attached thereto is inserted within an appropriately-sized cavity in the housing and the housing being subsequently deformed to encapsulate the nut therein.

The assembly of the extension tube assembly 300 will now be described. FIG. 11 shows an exploded, perspective view of the extension tube assembly 300 with the screw 304, transmission member 328, nut 306, and housing 302 in a longitudinally-and co-axially-aligned orientation. As then shown in FIG. 12, the nut 306 is threadingly mounted onto the screw 304. It will be understood that this sub-assembly can be provided by itself as a unit or sold mounted to the housing 302. The sub-assembly of the screw 304 and the nut 306 is inserted within the second end 310 of the housing 302 and retained therein by the punched-in areas 312 and 350 as shown in FIG. 13.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention which is defined by the appended claims.

What is claimed is:

1. In a jack extension tube for vehicles comprising:
   a tube having a first section with an open end and a second section spaced from the first section, the tube made from a first material;
   a nut made from a second material less rigid than the first material and fixedly mounted in the first section, the nut having first and second opposed faces and a threaded bore therethrough, the threaded bore terminating in the first and second faces of the nut;
   a mounting flange in the second section adapted to receive a fastener; and
   a jack screw received in the first section open end and threadably received in the threaded bore of the nut, the jack screw having at least one of an exposed end with a gear, an opposite end defining a stop which retains the nut on the jack screw when the nut is threaded to the opposite end of the jack screw, and a gear housing mounted adjacent to the screw, the jack screw thereby being threadingly mounted for movement between a fully extended and a fully retracted position with respect to the nut;
   the improvement comprising:
   the nut has an extension extending outwardly from each of the first and second faces thereof, the extensions made from a third material less rigid than the first material;
   whereby the extension on each face of the nut is configured so as to contact the at least one of the gear, the stop, and the gear housing to thereby prevent the screw both from damaging the nut by drawing the at least one of the gear, the stop, and the gear housing into the nut as well as drawing the at least one of the gear, the stop, and the gear housing into the elongated tube as the jack screw approaches the fully extended or fully retracted positions with respect to the nut.

2. The jack extension tube of claim 1 wherein the third material is the same as the second material whereby the nut and the extensions are made as a unit from the same material.

3. The jack extension tube of claim 2 wherein the stop is made from the same material as the nut.

4. The jack extension tube of claim 3 wherein the at least one of the gear and the gear housing has a portion contacting the nut in the fully retracted position made from the same material as the nut.

5. The jack extension tube of claim 4 wherein the housing comprises at least one punched-in area adjacent either opposed face of the nut to retain the nut within the housing and thereby prevent axial movement of the threaded nut within the elongated tube.

6. The jack extension tube of claim 5 wherein the second material comprises rigid synthetic resin material.

7. The jack extension tube of claim 6 wherein the first material comprises one of aluminum, steel and a steel alloy.

8. The jack extension tube of claim 7 wherein the second material is reinforced with fibers.

9. The jack extension tube of claim 8 wherein the second material is a reinforced nylon material.

10. The jack extension tube of claim 9 wherein threads on the threaded bore of the nut are involute threads.

11. The jack extension tube of claim 1 wherein the stop is made from the second material.

12. The jack extension tube of claim 1 wherein at least one of the gear and the gear housing has a portion contacting the nut in the fully retracted position made from the second material.

13. The jack extension tube of claim 1 wherein the housing comprises at least one punched-in area adjacent either opposed face of the nut to retain the nut within the housing and thereby prevent axial movement of the threaded nut within the elongated tube.

14. The jack extension tube of claim 1 wherein the second material comprises rigid synthetic resin material.

15. The jack extension tube of claim 1 wherein the first material comprises one of aluminum, steel and a steel alloy.

16. The jack extension tube of claim 1 wherein the second material is reinforced with fibers.

17. The jack extension tube of claim 1 wherein the second material is a reinforced nylon material.

18. The jack extension tube of claim 1 wherein threads on the threaded bore of the nut are involute threads.

19. The jack extension tube of claim 1 wherein the fixed mounting of the nut to the tube comprises deformed areas of the tube encapsulating at least a portion of each of the opposed faces of the nut to prevent substantial axial movement of the nut with respect to the tube.

20. The jack extension tube of claim 19 wherein at least one of the extensions of the nut extends beyond the deformed areas of the housing whereby the at least one of the extensions form a bearing surface for receiving the at least one of the at least one of the gear, the stop, and the gear housing when the screw approaches the fully extended or fully retracted positions with respect to the nut.

* * * * *

UNITED STATES PATENT AND TRADEMARK OFFICE
CERTIFICATE OF CORRECTION

PATENT NO. : 6,464,421 B1 Page 1 of 1
DATED : October 15, 2002
INVENTOR(S) : James Kiefer It is certified that error appears in the above-identified patent and that said Letters Patent is hereby corrected as shown below:

Column 10,
Line 62, "form" should read -- forms --.
Line 63, "the at least one of" should be deleted. Phrase is repeated.

Signed and Sealed this

Eleventh Day of February, 2003

JAMES E. ROGAN
*Director of the United States Patent and Trademark Office*